United States Patent [19]

Letner et al.

[11] 4,212,363

[45] Jul. 15, 1980

[54] TWIST-TYPE CONTROL HANDLE FOR LAWN MOWERS

[75] Inventors: Eugene Letner, Richmond Hill; Donald L. Gobin, Savannah, both of Ga.

[73] Assignee: Roper Corporation, Kankakee, Ill.

[21] Appl. No.: 938,969

[22] Filed: Sep. 1, 1978

[51] Int. Cl.² .................................................. B62D 51/04
[52] U.S. Cl. ............................ 180/19 H; 16/111 A; 74/489
[58] Field of Search ............... 180/19 H, 19 R, 77 R, 180/99, 103 R, 103 BF; 280/47.17; 16/111 A; 56/10.8, 11.3, 11.6, 11.8, DIG. 18; 74/489, 488, 527; 192/99 R, 99 S

[56] References Cited

U.S. PATENT DOCUMENTS

| | | | |
|---|---|---|---|
| 1,511,040 | 10/1924 | Ramsey | 56/11.4 |
| 2,336,642 | 12/1943 | Schreck | 180/19 R |
| 2,464,980 | 3/1949 | Kuehn | 180/19 R |
| 2,680,947 | 6/1954 | Weimer | 180/19 R |
| 3,228,177 | 1/1966 | Coates | 56/10.8 |
| 3,362,497 | 1/1968 | Nichols | 180/19 R |
| 3,401,951 | 9/1968 | Bloom | 280/47.17 |

*Primary Examiner*—John A. Pekar
*Attorney, Agent, or Firm*—C. Frederick Leydig; Richard L. Voit; David J. Richter

[57] ABSTRACT

A power lawn mower having a transversely arranged tubular grip for manual control rockable forwardly from a reference position to adjust a power control member. The grip is of oval cross section dimensioned to fit the grasp of the operator's hands. When the grip is in reference position the long dimension of the oval is angled rearwardly and downwardly so as to be substantially parallel to the operator's palms in a natural grasping position, so that the operator can sense by the orientation of his hands the neutral, or starting, position of the power control member and, upon forward rocking, the degree of departure from neutral position. A safety latch is provided for securely latching the grip in its reference position. A latch-releasing trigger on the grip is positioned to be manually engageable by at least one hand of the operator incident to grasping the grip for releasing the latch and thereby releasing the grip for forward rocking movement. The grip is coupled to the power control member by a cable having a return spring for restoring the grip to latched reference position when the grip is manually released, providing a so-called "dead man" control.

7 Claims, 6 Drawing Figures

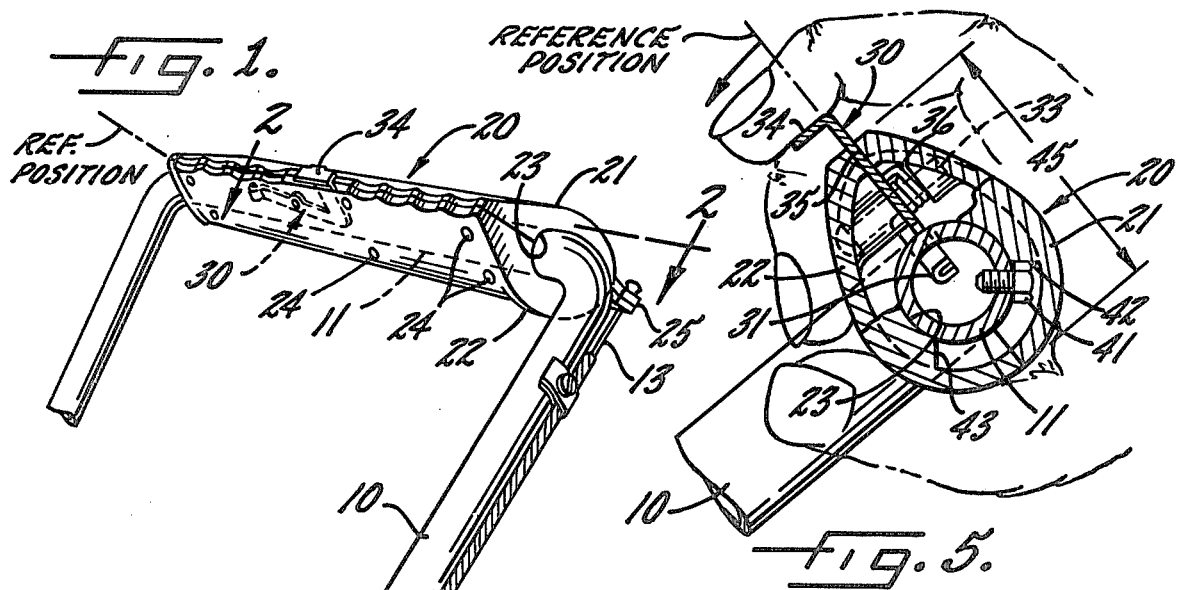

TWIST-TYPE CONTROL HANDLE FOR LAWN MOWERS

Numerous examples can be found in the art of a twist type grip for operating a power control member in a walking type lawn mower or the like for the purpose of controlling engine speed, forward motion, or the cutting blade. However, none of the prior control arrangements of this type serve to automatically inform the operator of the position of the control on an automatic and continuous basis nor do the prior devices provide an adequate degree of safety against inadvertent actuation.

It is, accordingly, an object of the present invention to provide a tubular grip for a walking type power lawn mower or the like and which is rockingly, i.e. twistingly, mounted for control of the position or status of a power control member but which has a high degree of safety combined with comfort and convenience.

It is a related object of the invention to provide safe means for controlling of power in a walking type lawn mower in which safety is not purchased at the cost of inconvenient or awkwardly arranged control elements but in which safety is a by-product of natural control movements on the part of the operator in the grasping and then turning of a tubular gripping element.

It is an object of the invention in one of its aspects to provide a tubular gripping element of non-circular, viz., oval, shape which is so phased with respect to the power control member that when the gripping element is grasped in a normal and natural way the operator can sense by the orientation of his hands the neutral position of the power control member on the mower as well as the degree of subsequent departure from the neutral position, thereby providing continuous and automatic "sensed" indication of the status of the power control member.

It is another object of the present invention to provide a tubular gripping element for operating the power control member on a mower or the like which cannot be operated inadvertently but which requires two successive but natural movements in order to activate the mower, first application of gripping pressure and, secondly, forward rotation of the gripping element to place the mower in its operating mode. In this connection it is an object to provide a control for a rotary mower which includes latching means for normally latching the tubular grip in its reference position together with a latch-releasing trigger on the tubular grip positioned to be engageable by at least one hand of the operator incident to grasping the grip for releasing the latching and thereby releasing the grip for forward rocking movement. It is a more detailed object to provide a latch and latch releasing trigger of highly economical construction, with the two elements being formed in a single piece and capable of operation without special thought on the part of the mower operator.

It is still another object of the present invention to provide a tubular grip for operating a power control member on a mower or the like which is highly flexible in use and which may be employed, as desired, for operating the engine throttle, a traction clutch at the output of the engine, a gear shifting arrangement, a blade control or the like. Regardless of the specific application, it is an object to provide a tubular grip which requires constant grasping by at least one hand of the operator to keep the mower in its operating mode and which when released, either intentionally or accidentally, is restored to a safe latched reference condition, automatically disabling the mower to prevent the same from causing injury.

It is yet another object of the present invention to provide a control system for a walking type power lawn mower or the like which is highly economical, which consists of a minimum number of parts and which may be fully utilized not only on mowers of new design but on designs of mowers already in the field.

Other objects and advantages of the invention will become apparent upon reading the attached detailed description and upon reference to the drawing in which:

FIG. 1 is a fragmentary view showing the upper portion of the handle for a power lawn mower including a tubular grip constructed and installed in accordance with the present invention.

FIG. 2 is a fragmentary sectional view taken through the tubular grip looking along line 2—2 in FIG. 1 and showing the latching lever in profile.

FIG. 3 is a fragmentary section similar to FIG. 2 but showing the latching lever in its disengaged condition.

FIG. 4 is a fragmentary section showing the latching lever as viewed along line 4—4 in FIG. 2.

FIG. 5 is a cross sectional view looking along line 5—5 in FIG. 2 and showing the tubular grip in reference position.

FIG. 6 is a cross sectional view similar to FIG. 5 but showing the tubular grip rocked into its position of maximum throw.

While the invention has been described in connection with a preferred embodiment, it will be understood that I do not intend to be limited to the particular embodiment shown but intend, on the contrary, to cover the various alternative and equivalent constructions included within the spirit and scope of the appended claims.

Turning now to the drawing there is shown a handle 10 of a power mower, the handle being of conventional tubular construction including a cross bar 11 extending transversely at its upper end at a convenient gripping height. Leading downwardly along one side of the handle is a control cable 12 having an upper end 13 and a lower end 14. The lower end of the cable is connected to a power control member 15 for performing any desired control function, either in forward propulsion or in driving of the mower blade. In the present instance the power control member controls a clutch 16 interposed between the engine 17 and wheels 18. The power control mechanism has a neutral position corresponding to the declutched state and a position of maximum throw for normal forward motion, as indicated in the drawing.

In carrying out the present invention a tubular grip is snugly telescoped over the cross bar and rockable forwardly from a reference position, the grip being eccentrically coupled to the upper end 13 of the cable so that rocking the grip forwardly advances the power control member from its neutral position to the position of maximum throw. The tubular grip, indicated at 20, is formed of separate upper and lower pieces 21, 22 of mating channel cross section defining between them an opening 23 which is snugly but rockably fitted to the cross bar 11, with the parting plane on the cross bar axis. The portions of the tubular grip are secured together by a series of screws 24 (see FIG. 2) which may be of the self-tapping type. An eccentrically located tab 25 serves as an anchoring point for the upper end 13 of the control cable. The cable may preferably be terminated in an eye pivotally engaged by an eccentrically positioned, axially oriented screw.

In accordance with the invention a latch is provided for normally latching the tubular grip in an initial or reference position, and a latch-releasing trigger is provided on the grip in a position to be manually engaged by at least one hand of the operator for disengagement of the latch upon inward pressing as the grip is grasped and prior to rocking movement. As a result, two separate operations must be performed before the power control member 15 is activated, making it practically impossible for the power control member to be moved inadvertently. As shown in FIGS. 2, 3 and 4 the latch member, generally indicated at 30, has a detent 31 which registers with an opening 32 formed in the wall of the cross bar 11. The latch member 30 is in the form of a lever of the first class centrally pivoted in the grip for movement about a pin 33. At the end of the lever opposite the detent is a latch-releasing trigger 34 which extends through an opening in the form of a slit 35 formed at the mating edges of the grip, preferably at the forward edge thereof. A spring 36 biases the latch into latched condition (FIG. 2). In use the spring is overcome by normal gripping pressure P (FIGS. 3 and 6) to retract the detent 31 from the opening 32 to enable forward rocking movement of the grip. It is to be noted that the latch 30 including detent 31 and its releasing trigger 34 are integrally formed as a single piece, preferably a metal stamping, for maximum economy.

It is a further feature of the present control that a return spring is coupled to the grip and cable so that the grip is biased into its reference position corresponding to the neutral position of the power control member. Such spring is indicated at 40 in FIG. 1. The spring serves to urge the grip against a stop to define its reference position, the stop in the present instance being in the form of a screw 41 anchored in the cross bar 11 (FIG. 5) and which serves as a lug in the path of movement of a stop surface 42 internally formed in the upper half of the tubular grip. The same screw may be used to cooperate with a second stop surface 43 (FIG. 6) formed in the lower half of the grip to define the position of maximum throw. An unobstructed path or channel is provided between stop surfaces 42 and 43 to allow free rotation of the grip between those limits.

In accordance with one of the further features of the present invention, the tubular grip is of oval cross section dimensioned to fit the grasp of the operator's hand, the long dimension of the oval being angled rearwardly and downwardly when the grip is in reference position so as to be substantially parallel to the palms of the operator when they are placed in a natural grasping position, so that the operator can sense by the orientation of his hands the neutral position of the power control member as well as a subsequent degree of departure from the neutral position. More specifically, in the preferred form of the invention the grip is of egg-shaped cross section with the portion of the "egg" of narrow dimension being oriented toward the front of the grip. By orienting the long dimension 45 of the grip cross section as shown, the relatively flat side of the oval is certain to be, initially, in a natural grasping position so there is no necessity for fumbling or changing the position of the hands on the grip. The long dimension 45 of the cross section preferably rocks from a reference position in which it is inclined downwardly and rearwardly to a position of maximum throw (FIG. 6) in which the long dimension extends forwardly and downwardly, corresponding to the maximum throw of the power control member 15. The entire range of movement of the tubular grip is, as a result, within the range of operator comfort.

Because of the oval, that is to say, non-circular, cross section of the tubular grip which fits the grasp of the operator only in a certain phase position, the operator is constantly informed of the phase position of the power control member just by sensing the condition of his hands on the grip. In short, the feel of the grip, alone, tells the operator of the condition of the clutch 16. In alternative uses of the invention, where the power control member may be in the form of an engine throttle, the degree of departure of the grip from the neutral position, again sensed by the operator's hands, informs him of the throttle position. This is not only a convenience when the machine is operating normally but it also is a telltale for abnormal operation, a signal that service is necessary. While an oval, or egg-shaped, cross section is preferred, it will be understood that it is not essential to the practice of the invention and, accordingly, the term "oval" as used herein shall be understood to include a non-circular "oblong" cross section having one long dimension to provide palm orientation, and the cross section may approach rectangular, or even triangular, shape with the edges thereof being smoothly rounded for the sake of comfort.

The operating safety and convenience will be apparent by considering typical usage: The engine will be assumed to be running and the tubular grip 20 will be assumed to occupy the reference position illustrated in FIGS. 1 and 5, with the long dimension of the grip in position for convenient gripping. The operator places both of his hands on the tubular grip in a natural grasping position, curling the fingers over the front edge of the grip causing the fingers of at least one hand to apply inward pressure upon the latch trigger 34, thus removing the latch detent 31 from the opening 32 and freeing the grip for rocking movement. Then, and only then, can the grip be rocked, or twisted, forwardly into the position shown in FIG. 6, following which the pressure on the trigger may be released, the rocking causing movement of the power control member 15 and engagement of the clutch 16. The mower thus proceeds forwardly. When it is desired to stop, the tubular grip is rocked backwardly into the position illustrated in FIG. 5, causing de-clutching of the drive and restoring the detent to latching position.

In the event that the operator upon proceeding forwardly, and with the grip in the condition shown in FIG. 6, should suddenly "let go", for example, as a result of an emergency, the return spring 40 acting upon the cable 12 will rotate the grip back to its initial reference position at which point bottoming will occur between stops 41, 42,, accompanied by prompt and automatic de-clutching to bring the mower to an immediate stop. This type of control is usually referred to as "dead man" control.

In the illustrated construction the return spring 40 which accomplishes the dead man feature is coupled to the power control member at the lower end of the cable. However, it will be apparent to one skilled in the art that a return spring may, if desired, be interposed directly in the tubular grip, between the grip and the cross bar 11, without departing from the invention. Also while the cross bar 11 is shown as continuous and extensive, it may, if desired, be in the form of separated stub-shafts projecting inwardly into the grip from each end.

While a cable 12 has been shown coupling the tubular grip and a power control member, it will be apparent that any motion transmitting connection between the two points will accomplish the desired function, and hence the term "cable" shall be construed broadly enough to include any linkage or equivalent mechanical connection.

Where the control mechanism is employed to control a clutch, as described, the "neutral" position corresponds to the de-clutched condition. Where the same control is used, instead, to control an engine throttle, it will be understood that the neutral condition may correspond to idling condition. Also where the control is employed to shift the gears of a gear train, the positions of maximum throw and neutral will be understood to correspond to engagement of different sets of gears. It will be obvious that the invention, although particularly applicable to a walking mower, is also applicable to other types of self-powered walking implements.

What is claimed is:

1. In a walking type power lawn mower or the like the combination comprising a power control member having a neutral position and movable therefrom to a position of maximum throw, a handle for manual guidance including a transversely arranged cross bar at a convenient gripping height, a tubular grip snugly telescoped over the cross bar and rockable thereon forwardly from a reference position, means including a cable coupled to the tubular grip at one end and to the power control member at the other end to increase the setting of the latter in accordance with the degree of movement of the grip from reference position, the grip being of oval cross section dimensioned to fit the grasp of the operator's hand, the long dimension of the oval being angled rearwardly and downwardly in reference position so as to be substantially parallel to the palms of the operator when they are placed in a natural grasping position on the grip whereby the operator can sense by the orientation of his hands the neutral position of the power control member as well as the subsequent degree of departure from neutral position, latching means for normally latching the tubular grip in its reference position, and a latch-releasing trigger on the tubular grip positioned to be manually engageable by at least one hand of the operator incident to grasping the grip for releasing the latch and thereby releasing the grip for forward rocking movement.

2. The combination as claimed in claim 1 in which the grip and cable have a return spring coupled thereto for restoring the grip to its latched reference position when the grip is released.

3. In a walking type power lawn mower or the like the combination comprising a power control member having a neutral position and movable therefrom to a position of maximum throw, a handle for manual guidance including a transversely arranged cross bar at a convenient gripping height, a tubular grip snugly telescoped over the cross bar and rockable thereon forwardly from a reference position, means including a cable coupled to the tubular grip at one end and to the power control member at the other end to increase the setting of the latter in accordance with the degree of rocking movement of the grip from reference position, the grip and cable having a return spring coupled thereto for restoring the grip to reference position, the tubular grip being of substantially constant oval cross section with the cross bar being arranged substantially centrally within the oval, a stop member in the form of a lug on the cross bar, and a stop surface within the grip cooperating with the lug for positively defining the reference position of the grip, the tubular grip being so oriented that the long axis of its oval cross section is directed rearwardly and downwardly when the grip is in reference position.

4. The combination as claimed in claim 3 in which the motion of the tubular grip and motion of the power control member are so related that when the power control member is in its position of maximum throw the long axis of the oval cross section of the grip is oriented forwardly and downwardly.

5. In a walking type power lawn mower or the like the combination comprising a power control member having a neutral position and movable therefrom to a position of maximum throw, a handle for manual guidance including a transversely arranged cross bar at a convenient gripping height, a tubular grip snugly telescoped over the cross bar and rockable thereon forwardly from a reference position, means including a cable coupled to the grip at one end and to the power control member at the other end to increase the setting of the latter in accordance with the degree of rocking movement of the grip from its reference position, and means including a latching means for normally latching the grip in its reference position, the latching means having a latch-releasing trigger positioned on the grip for disengagement of the latch upon inward pressing movement as the grip is grasped and prior to rocking thereof, the grip and cable having a return spring coupled thereto for restoring the grip to its latched reference position when the grip is released.

6. The combination as claimed in claim 1 or claim 5 in which the latching means includes a manually shiftable detent mounted in the grip cooperating with a keying recess in the cross bar, the grip having a spring for pressing the detent into engagement with the cross bar and in which the latch-releasing trigger has one end coupled to the detent and the other end projecting through the grip for inwardly pressed movement upon grasping the same.

7. The combination as claimed in claim 1 or claim 5 in which the latching means is in the form of a pivoted lever mounted in the grip having a detent at one end registering with a hole in the cross bar and a latch-releasing trigger at the other end projecting radially outwardly through the grip, and a spring for biasing the lever to urge the detent into the recess and to urge the trigger into outwardly-extended position, the trigger being so located that it is pressed inwardly of the grip incident to normal grasping by the operator.

* * * * *